United States Patent [19]

McKeown

[11] Patent Number: 5,500,858
[45] Date of Patent: Mar. 19, 1996

[54] METHOD AND APPARATUS FOR SCHEDULING CELLS IN AN INPUT-QUEUED SWITCH

[75] Inventor: Nicholas W. McKeown, Berkeley, Calif.

[73] Assignee: The Regents of the University of California, Berkeley, Calif.

[21] Appl. No.: 359,890

[22] Filed: Dec. 20, 1994

[51] Int. Cl.$^6$ ................................................. H04L 12/56
[52] U.S. Cl. .................................................. 370/60
[58] Field of Search ........................... 370/60, 60.1, 94.1, 370/185.6, 85.13, 91.1, 95.3, 61, 63, 64, 65.5, 68, 112, 68.1, 61; 340/825.5, 825.51, 825.52

[56] References Cited

U.S. PATENT DOCUMENTS

| | | | |
|---|---|---|---|
| 5,267,235 | 11/1993 | Thacker | 370/60 |
| 5,287,347 | 2/1994 | Spanke | 370/85.6 |
| 5,416,769 | 5/1995 | Karol | 370/85.6 |

OTHER PUBLICATIONS

Anderson, et al., "High Speed Switch Scheduling for Local Area Networks," ACM Transactions on Computer System, Nov. 1993, pp. 319–352.

Primary Examiner—Douglas W. Olms
Assistant Examiner—Dang Ton
Attorney, Agent, or Firm—Flehr, Hohbach, Test, Albritton & Herbert

[57] ABSTRACT

A high-bandwidth input-queued switch includes a set of input queues, a rotating priority iterative matching desynchronizing scheduler, and a crossbar switch. Each input queue includes at least one stored cell with an output device designation signal and a data signal. Each output device designation signal is processed by the rotating priority iterative matching desynchronizing scheduler so that the data signal associated with the output device designation signal is routed through the crossbar switch to an output device specified by the output device designation signal. The rotating priority iterative matching desynchronizing scheduler includes a set of grant scheduler units, each of which receives a set of device designation signals and generates an input device grant signal on the basis of a grant scheduler priority designation signal. The scheduler also includes a set of accept scheduling units, each of which receives a set of input device grant signals from the grant scheduling units, and generates a input/output match signal on the basis of an accept scheduler priority designation signal. Each grant scheduling unit includes a grant scheduler register that stores the grant scheduler priority designation signal. The grant scheduler priority designation signal is incremented when an input device grant signal results in an input/output match signal at one of the accept scheduler units. Each accept scheduler unit includes an accept scheduler register that stores the accept scheduler priority designation signal. The accept scheduler priority designation signal is incremented when the input/output match signal is selected.

23 Claims, 9 Drawing Sheets

| Request | Grant Pointers | Grant | Accept Pointers | Accept |
|---|---|---|---|---|
| i_1 → j_1 | g_1 → 1 | j_1 → i_1 | a_1 → 1 | i_1 → j_1 |
| i_2 → j_2 | g_2 → 1 | j_2  i_2 | a_2 → 1 | i_2  j_2 |
| i_3 → j_3 | g_3 → 1 | j_3 → i_3 | a_3 → 1 | i_3 → j_3 |
| i_4  j_4 | g_4 → 1 | j_4  i_4 | a_4 → 1 | i_4  j_4 |

Figure 5

METHOD AND APPARATUS FOR SCHEDULING CELLS IN AN INPUT-QUEUED SWITCH

BRIEF DESCRIPTION OF THE INVENTION

This invention relates generally to the scheduling of cells in a high-bandwidth input-queued switch, for instance as used in asynchronous transfer mode networks. More particularly, this invention describes a rotating priority iterative matching desynchronization technique that improves cell processing in an input-queued switch.

BACKGROUND OF THE INVENTION

Networks are widely used to allow computers to communicate with one another. That is, a source computer uses a network to pass data to a destination computer. The data is typically divided into cells of information.

Networks originally evolved by relying upon a single link to communicate between computers. Examples of the single link architecture include Ethernet networks and Token Ring networks. The problem with a single link architecture is that it has limited data throughput.

In view of the bandwidth problems of a single link architecture, there is an increasing interest in arbitrary topology cell-based local area networks, such as Asynchronous Transfer Mode (ATM) networks. In these networks, computers are connected together by an arbitrary graph of communication links and switches. Arbitrary topology networks offer a number of potential advantages, including: (1) aggregate throughput that can be much larger than that of a single link, (2) the ability to add throughput incrementally as the workload changes by simply adding extra links and switches, (3) improved fault tolerance by allowing redundant paths between hosts, and (4) reduced latency because control over the entire network is not needed to insert data.

To realize the potential advantages of arbitrary topology networks, a high performance switch is needed to take a cell arriving on an input link and quickly deliver it to the appropriate output link. A switch has three components: a physical switch, a scheduling mechanism to arbitrate when cells arrive on different inputs destined for the same output, and a queuing mechanism at inputs or outputs to hold those cells that lose the arbitration.

The queuing mechanism is used to store a set of incoming cells. Each incoming cell contains data and an identifier that indicates which output it is destined for. In the case of an ATM network, each cell has 48 bytes of data and 5 bytes of identification information. The physical switch can be implemented as a crossbar switch which allows any input to be routed to any output. As known in the art, a crossbar switch may be implemented as a matrix of transistors.

The construction of the physical switch and queuing mechanism is straightforward. However, the construction of a scheduling mechanism is rather complex and represents the performance bottleneck in most high throughput switches.

It is the job of the scheduling mechanism to identify a conflict-free match between inputs and the outputs of the switch. That is, the input cells at the input of the switch must be matched to particular outputs of the switch. Each input is connected to at most one output and each output is connected to at most one input.

Ideally, the scheduling mechanism finds the maximum number of matches between inputs and outputs. The problem with a maximum matching approach is that it is computationally expensive. In addition, such an approach can result in a continuously unserviced input-output connection under certain traffic patterns. Thus, techniques have been developed to achieve a maximal, not a maximum match. These algorithms iteratively add connections to fill in the missing connections left by a previous iteration. Because the connections made in previous iterations may not be removed, this technique does not always lead to a maximum match. However, it is possible to achieve a close approximation to the maximum for many traffic patterns.

Parallel Iterative Matching (PIM) is a successful scheduling technique that is described in U.S. Pat. No. 5,267,235, which is expressly incorporated by reference herein. PIM uses randomness to avoid starvation (a continuously unserviced input cell), and to reduce the number of iterations needed to converge on a maximal matching. PIM attempts to quickly converge on a conflict-free match in multiple iterations where each iteration consists of three phases. All inputs and outputs are initially unmatched and only those inputs and outputs not matched at the end of one iteration are eligible for matching in the next iteration. The three phases of each iteration operate in parallel on each output and input and are as follows:

1. Request. Each unmatched input sends a request to every output for which it has a queued cell.
2. Grant. If an unmatched output receives any requests, it grants to only one by randomly selecting a request uniformly over all requests.
3. Accept. If an input receives a grant, it accepts one by selecting an output among those that granted to this output.

Note that in phase (2) of the PIM scheduling technique the independent output schedulers randomly select a request among contending requests. This has three effects: first it can be shown that each iteration will match or eliminate on average at least ¾ of the remaining possible connections and thus the algorithm will converge to a maximal matching in $O(\log N)$ iterations. Second, it ensures that all requests will eventually be granted. As a result, no input queue remains continuously unserved. Third, it means that no memory or state is used to keep track of how recently a connection was made in the past. At the beginning of each cell time, the match begins over, independently of the matches that were made in previous cell times. Not only does this simplify understanding of the algorithm, it also makes analysis of the performance straightforward since there is no time-varying state to consider, except for the occupancy of the input queues.

Unfortunately, there are a number of shortcomings associated with the PIM technique. First, it is difficult and expensive to implement at high speed because each scheduler must make a random selection among the members of a varying input set. The varying input set must be ordered in such a manner that the random selection process is successful. For example, suppose an input vector can accept ten requests and there is a request at positions 3, 7, and 10. A random selection process may specify positions 1, 2, 4, 5, 6, 8, and 9 before a hit is made at a requesting position. In view of this situation, the random selection process must be tailored according to the varying selection set so that the random value selected corresponds to a filled position. This ordering of data results in substantial computational overhead. Thus, it would be highly desirable to provide a scheduling technique with reduced computational overhead.

Another problem with the PIM technique is that it does not perform well for a single iteration. Although the PIM technique will often converge to a good match after several iterations, this required convergence time affects the rate at which the switch can operate. It would be preferable to provide a technique that converges in a single iteration.

SUMMARY OF THE INVENTION

The invention is a high-bandwidth input-queued switch that includes a set of input queues, a rotating priority iterative matching desynchronizing scheduler, and a crossbar switch. Each input queue includes at least one stored cell with an output device designation signal and a data signal. Each output device designation signal is processed by the rotating priority iterative matching desynchronizing scheduler so that the data signal associated with the output device designation signal is routed through the crossbar switch to an output device specified by the output device designation signal. The rotating priority iterative matching desynchronizing scheduler includes a set of grant scheduler units, each of which receives a set of device designation signals and generates an input device grant signal on the basis of a grant scheduler priority designation signal. The scheduler also includes a set of accept scheduling units, each of which receives a set of input device grant signals from the grant scheduling units, and generates a input/output match signal on the basis of an accept scheduler priority designation signal. Each grant scheduling unit includes a grant scheduler register that stores the grant scheduler priority designation signal. The grant scheduler priority designation signal is incremented when an input device grant signal results in an input/output match signal at one of the accept scheduler units. Each accept scheduler unit includes an accept scheduler register that stores the accept scheduler priority designation signal. The accept scheduler priority designation signal is incremented when the input/output match signal is selected.

The scheduler of the invention is relatively easy to implement since each scheduler relies upon standard components in a straightforward configuration. In addition, the scheduler provides a highly efficient technique for processing queued cells. The processing of the cells tends to be evenly distributed by the scheduler as a result of a desynchronizing effect between individual scheduling units.

BRIEF DESCRIPTION OF THE DRAWINGS

For a better understanding of the nature and objects of the invention, reference should be made to the following detailed description taken in conjunction with the accompanying drawings, in which:

FIG. 5 illustrates a single iteration of the processing of the method of FIG. 2.

Like reference numerals refer to corresponding parts throughout the several views of the drawings.

DETAILED DESCRIPTION OF THE INVENTION

Figure 1:
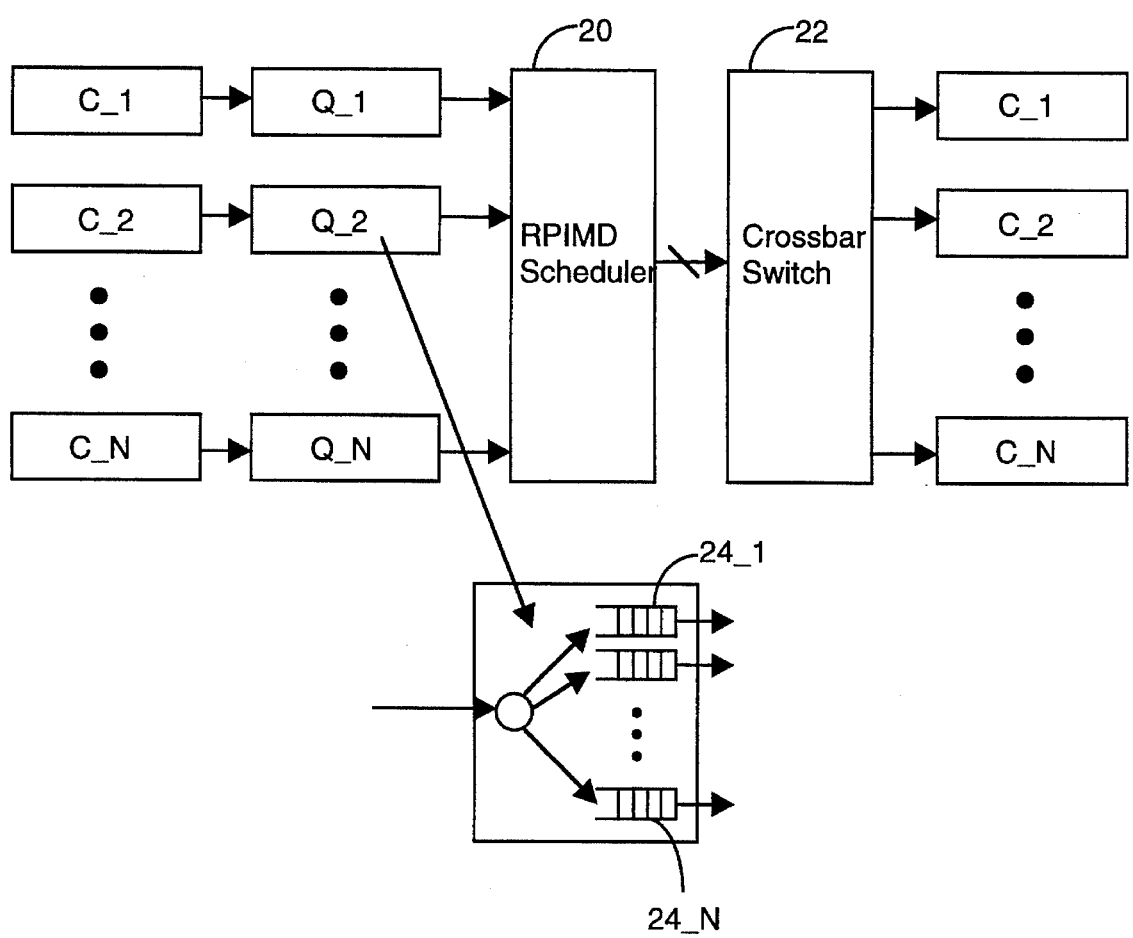
FIG. 1 illustrates an electronic switching environment in which the rotating priority iterative matching desynchronization apparatus of the invention may be used.

FIG. 1 is a general illustration of the apparatus of the invention and the environment in which it is used. A set of computers $C\_1, C\_2, \ldots, C\_N$ are illustrated on both sides of the figure. A set of input queues $Q\_1, Q\_2, \ldots, Q\_N$, a rotating priority iterative matching desynchronization (RPIMD) scheduler 20, and a crossbar switch 22 are used to form a network. The network allows each computer $C\_1, C\_2, \ldots, C\_N$ to communicate with every computer on the network. Computers $C\_1, C\_2, \ldots, C\_N$, input queues $Q\_1, Q\_2, Q\_N$, and crossbar switch 22 are known in the art. The present invention is directed toward the RPIMD scheduler 20.

Figure 2:
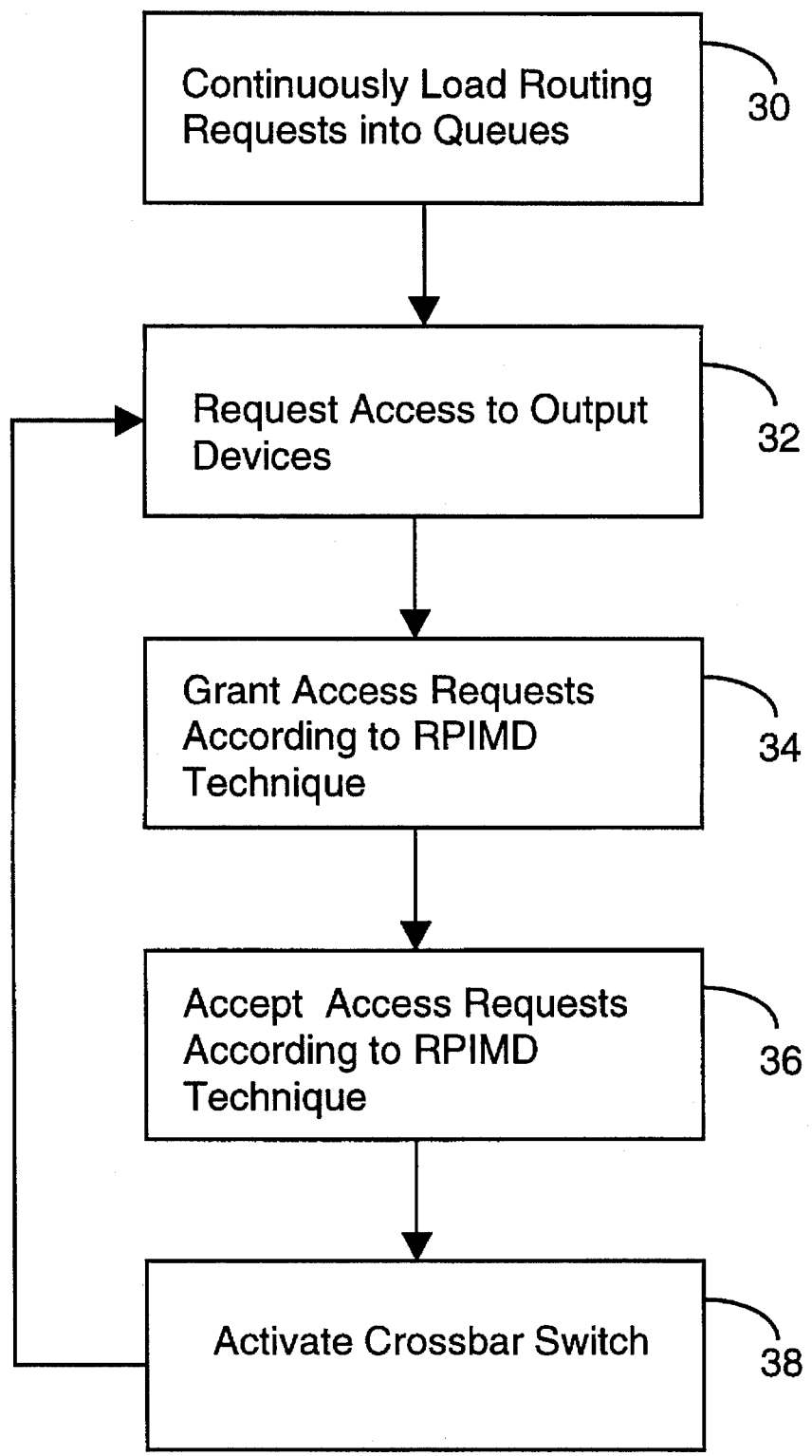
FIG. 2 illustrates the steps associated with the rotating priority iterative matching desynchronization method of the invention.

FIG. 2 illustrates the operations associated with the rotating priority iterative matching desynchronization method of the invention. The first step associated with the method is to load arriving cells into queues (block 30). For example, computer $C\_2$ in FIG. 1 loads cells into queue $Q\_2$. Queue $Q\_2$ includes N input FIFOs (First In First Out storage devices) $24\_1$ through $24\_N$. There is one input FIFO for each output device $C\_1$ through $C\_N$. One cell is delivered to one FIFO during a predetermined cell time slot. The N values at the front of FIFOs $24\_1$ through $24\_N$ form a request vector, as will be discussed below.

Each cell includes an output device designation signal and a data signal. The output device designation signal (a set of bits) specifies the output device, such as computer $C\_1$. The data signal (a set of bits) is the information that is passed to computer $C\_1$.

The next step associated with the process of FIG. 2 is to request access to the specified output devices (block 32). That is, for the N queues ($Q\_1$ through $Q\_N$), all cells existing at the front of a FIFO ($24\_1$ through $24\_N$ in each queue), request access to a corresponding output device.

After the request for access, access is granted according to the rotating priority iterative matching desynchronization technique of the invention (block 34). The processing up to this point is consistent with the processing associated with the PIM technique, which was discussed in the background section. However, at this point in the processing, the PIM technique establishes a grant on the basis of a random selection of the set of requests. For example, suppose $Q\_I$ and $Q\_N$ each have a single cell destined for computer $C\_2$. Under the PIM technique, the data to be sent to computer $C\_2$ would be designated by randomly selecting either the cell from queue $Q\_I$ or the cell from $Q\_N$.

In contrast to the random scheme used in the PIM technique, the present invention uses a rotating priority scheme. As its name implies, the rotating priority scheme selects the input request with the highest priority. Thereafter, the designation of the highest priority is incremented, causing the highest priority element of the last iteration to become the lowest priority element in the following iteration. This results in a rotating priority scheme. For example, at one instance in time the rotating priority may establish that a request at a third input vector position is the highest priority. Thus, if a cell from queue Q_1 is in the third input vector position and a cell from queue Q_2 is in the fourth input vector position, then the cell from queue Q_1 would be serviced first. The rotating priority would then be incremented to the fourth input vector position. Preferably, the incrementation step is only executed if the grant is subsequently accepted. As will be described below, this produces a desirable desynchronization effect between the schedulers.

The next step associated with the method of the invention is to accept access requests according to the rotating priority iterative matching desynchronization technique of the invention (block 36). For example, there may be cells from Q_2 that have requested access to computer C_1 and cells that have requested access to computer C_2. Computers C_1 and C_2 may have then granted access requests to the cells from queue Q_2. The accept step would select either computer C_1 or C_2. In other words, the accept step designates a single output from a set of available outputs. The PIM technique randomly selects an accepted access request. In contrast, the present invention uses a priority scheme of the type previously described. After the highest priority element is selected, the priority is incremented to one value beyond the accepted priority element.

The final processing step is to activate the crossbar switch (block 38). This results in an accepted cell being transmitted to a destination computer (C_1, C_2, ..., C_N). The process is then repeated.

The general principles of the invention have now been described. Attention will now turn to some examples of the operation of the invention in order to underscore its efficiencies and benefits. Thereafter, attention will turn to different options for implementing the invention.

Figure 3:
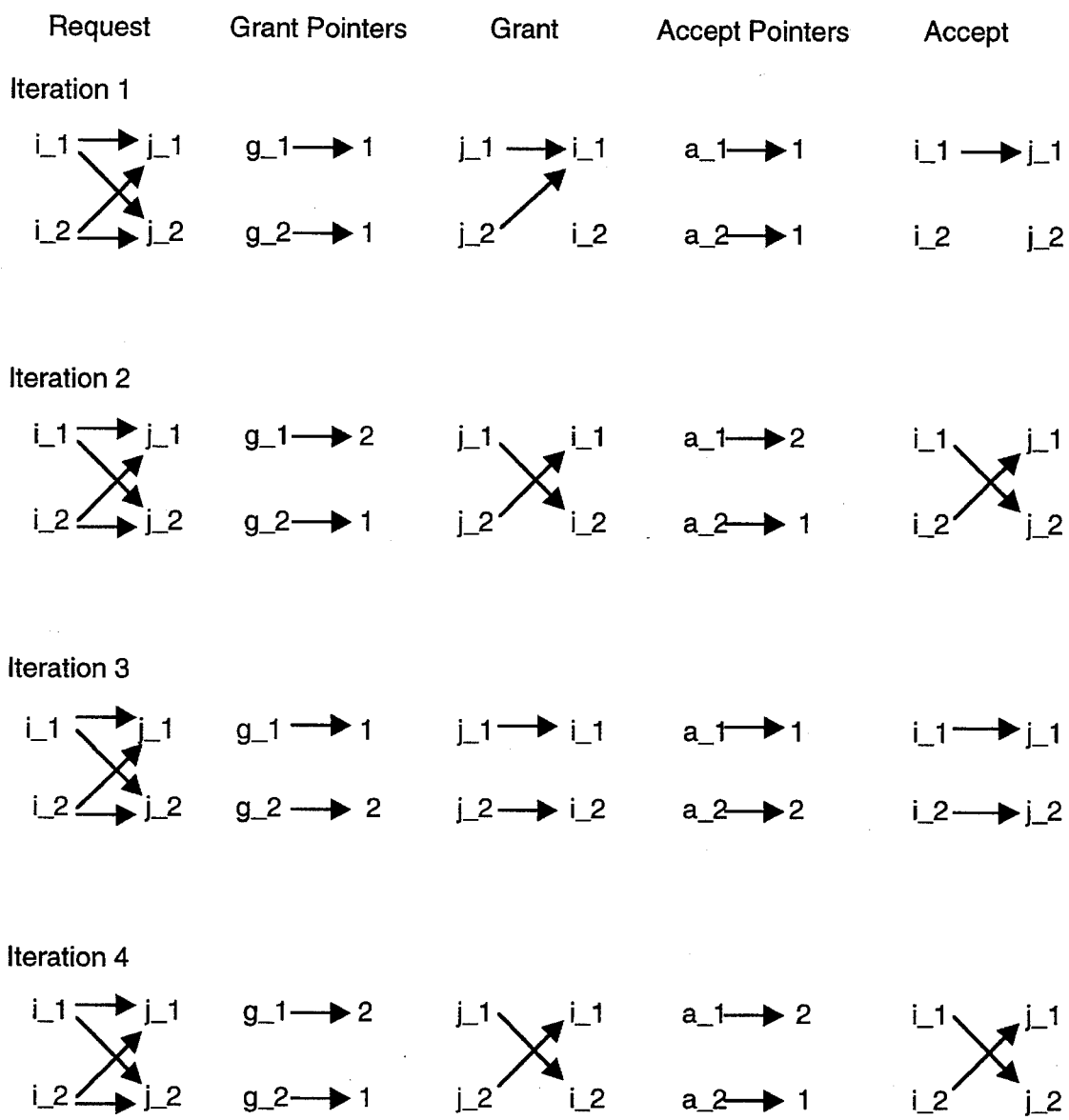
FIG. 3 illustrates four iterations of the processing of the method of FIG. 2.

FIG. 3 illustrates four iterations of the processing of FIG. 2. The figure illustrates a request step corresponding to block 32 of FIG. 2, a grant step corresponding to block 34 of FIG. 2, and an Accept step corresponding to block 36 of FIG. 2. In this basic example, the granting of access (block 34 of FIG. 2) is established by a simple two value rotating priority scheme. Similarly, the acceptance of an access request (block 36 of FIG. 2) is established by a two value rotating priority scheme.

The processing during iteration 1 begins with an input i_1 (for instance, the front cell of the first FIFO of Queue_1) that requests access to j_1 and also requests (for instance, the front cell of the second FIFO of Queue_1) access to j_2. Simultaneous with the request by input i_1, input i_2 requests access to outputs j_1 and j_2.

After the request phase, processing proceeds to the grant phase. As shown in the figure, the grant pointers g_1 and g_2 are each set to 1. In view of this situation, j_1 grants to i_1 and j_2 does the same, as shown in the figure.

The accept phase is controlled by the accept pointers. Accept pointers a_1 and a_2 are each set to 1. In the accept phase, i_1 must select between j_1 and j_2. Since the pointer a_1 is set to 1, j_1 is selected, as shown. Now that a selection has been made, a cell is routed from i_1 to j_1.

Processing then proceeds to a second iteration. Note that during the second iteration the grant pointer g_1 has a value of 2 because j_1 was accepted during the processing in iteration 1, causing an incrementation of the grant pointer g_1 during iteration 1. On the other hand, j_2 was not accepted and therefore the grant pointer g_2 remained set at 1. Similarly, accept pointer a_1 was incremented to a value of 2 during iteration 1, but accept pointer a_2 remained at a value of 1.

The request phase for iteration 2 is the same as the request phase for iteration 1. In the grant phase for iteration 2, j_1 grants to i_2, while j_2 grants to i_1. This is done because grant pointer g_1 is set to a value of 2, while grant pointer g_2 is set to a value of 1.

In the accept phase of iteration 2, i_1 accepts j_2, and i_2 accepts j_1. Again, this result follows because accept pointer a_1 is set to a value of 2, and accept pointer a_2 is set to a value of 1.

Figure 4:
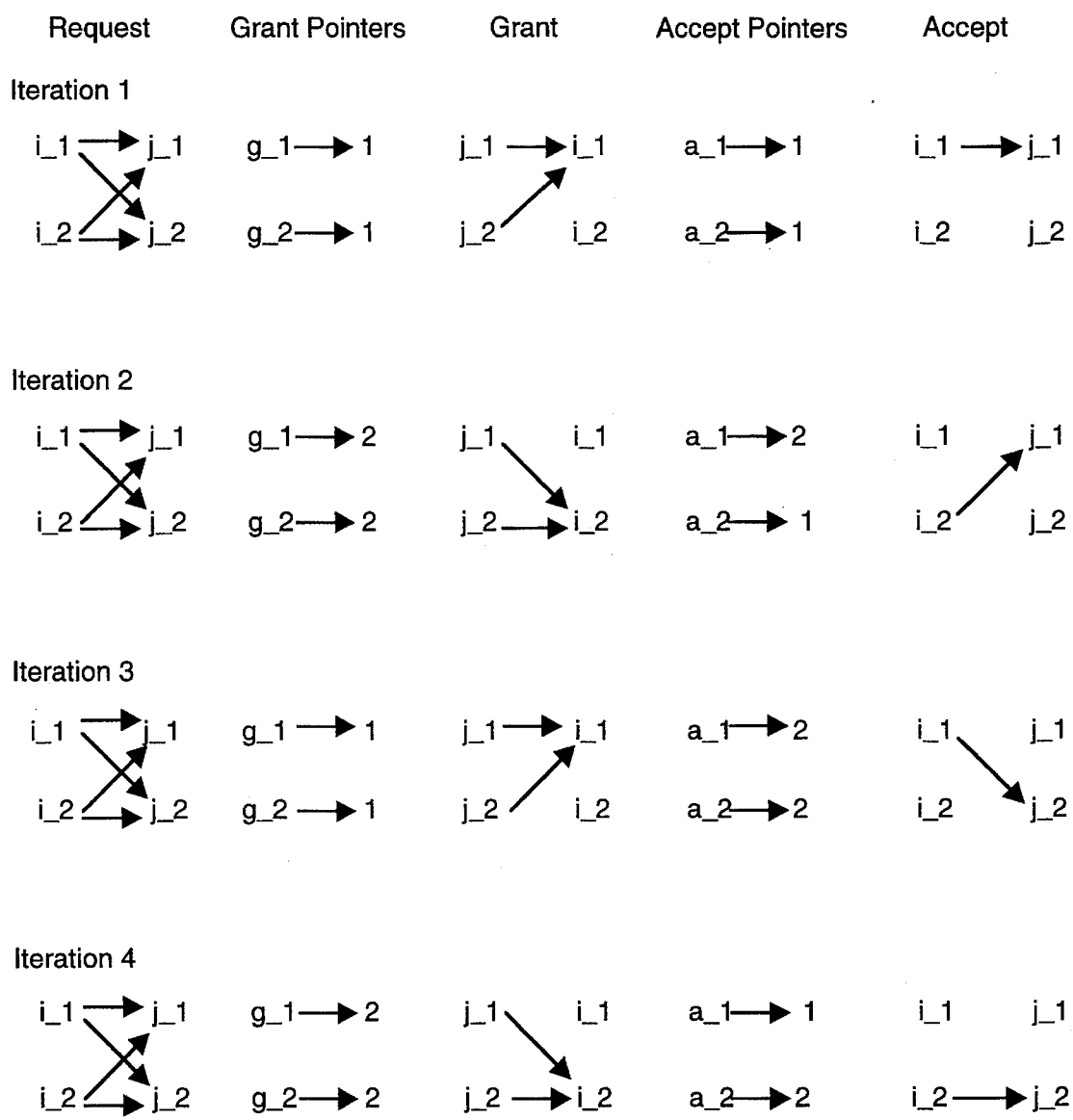
FIG. 4 illustrates four iterations of a sub-optimal modification to the processing of the method of FIG. 2.

The desynchronization aspect of the present invention should be noted at this time by referring to FIG. 4. Note in FIG. 4 that the processing of iteration 1 is the same as shown in FIG. 3. On the other hand, the processing of iteration 2 is different because both grant pointers in iteration 2 of FIG. 4 were incremented automatically. In contrast, in FIG. 3, only grant pointer g_1 was incremented because j_1 was accepted in the previous accept phase. The desynchronization of grant values leads to high processing efficiency.

Note in FIG. 4 that in the grant phase of iteration 2, both outputs j_1 and j_2 grant to input i_2, whereas in FIG. 3 outputs j_1 and j_2 respectively grant to i_2 and i_1. As can be seen in the figures, this results in two acceptances in the accept phase of the desynchronized grant values in FIG. 3, but only one acceptance in the accept phase of the synchronized grant values of FIG. 4.

In view of this example, a number of general observations may be made. When a requesting input is granted (say i_1 of cell 1 of FIG. 3), that input will have the lowest priority at the assigned output in a subsequent cycle (note in cell 2 of FIG. 3 that input i_1 is assigned to j_2). Also, whatever input has the highest priority at an output will continue to be granted during each successive iteration until it is serviced. For example, in the grant phase of iteration 2 of FIG. 3, input i_1 is the highest priority, and thus will continuously be granted until it is accepted and the pointer g_2 is incremented.

It should also be noted that in the desynchronized technique of FIG. 3, contention between granting outputs is avoided. Note that in the processing of iteration 1, both outputs J_1 and j_2 granted to input i_1. In the processing of iteration 2, output j_2 once again grants to input i_1. However, since grant pointer g_1 was incremented, input i_1 is a low priority for output j_1, consequently, output j_1 selects input i_1. Note in FIG. 4 that in the processing of iteration 2, the two outputs still contend, as they both attempt to grant to input i_2.

Completing now the example of FIG. 3, iteration 3 is processed as follows. Since both inputs were served in iteration 2, both grant pointers are incremented in iteration 3. Similarly, both accept pointers are incremented. The requests of iteration 3 are the same as the requests of iterations 1 and 2. In view of the position of the grant pointers, output j_1 grants to input i_1, and output j_2 grants to input i_2. The accept pointers establish that input i_1 accepts output j_1, while input i_2 accepts output j_2. Thus, all inputs and outputs are served. This stands in contrast to the processing in FIG. 4, where the grant phase contends for input i_1, and only one input is served.

The processing of iteration 4 in FIG. 3 is the same as the processing of iteration 2 in FIG. 3. The processing of iteration 4 in FIG. 4 once again underscores the conflicting grant operations and the result inefficiency as only one input is served at the accept phase.

FIG. 5 further illustrates the invention by depicting input cells i_1 through i_4 from corresponding input queues. The accept and grant pointers are all set to a value of 1. In the grant phase, outputs j_1 and j_2 each grant to input i_1. Output j_3 grants to input i_3. This is the only request, and therefore the grant pointer does not have to be used. Similarly, output j_4 grants to input i_3 because it is the only request. At the accept stage, input i_1 selects j_1, as specified by its corresponding accept pointer a_1, which is set to 1. Input i_3 selects j_3 from the options of j_3 and j_4. That is, the option closest to the specified pointer value is selected. The a_3 accept pointer is then incremented to a value of 4, one beyond the accepted value. Accept pointer a_1 will also be incremented by 1 and grant pointers g_1 and g_3 will be incremented by 1 because of the match in the accept stage.

Figure 6:
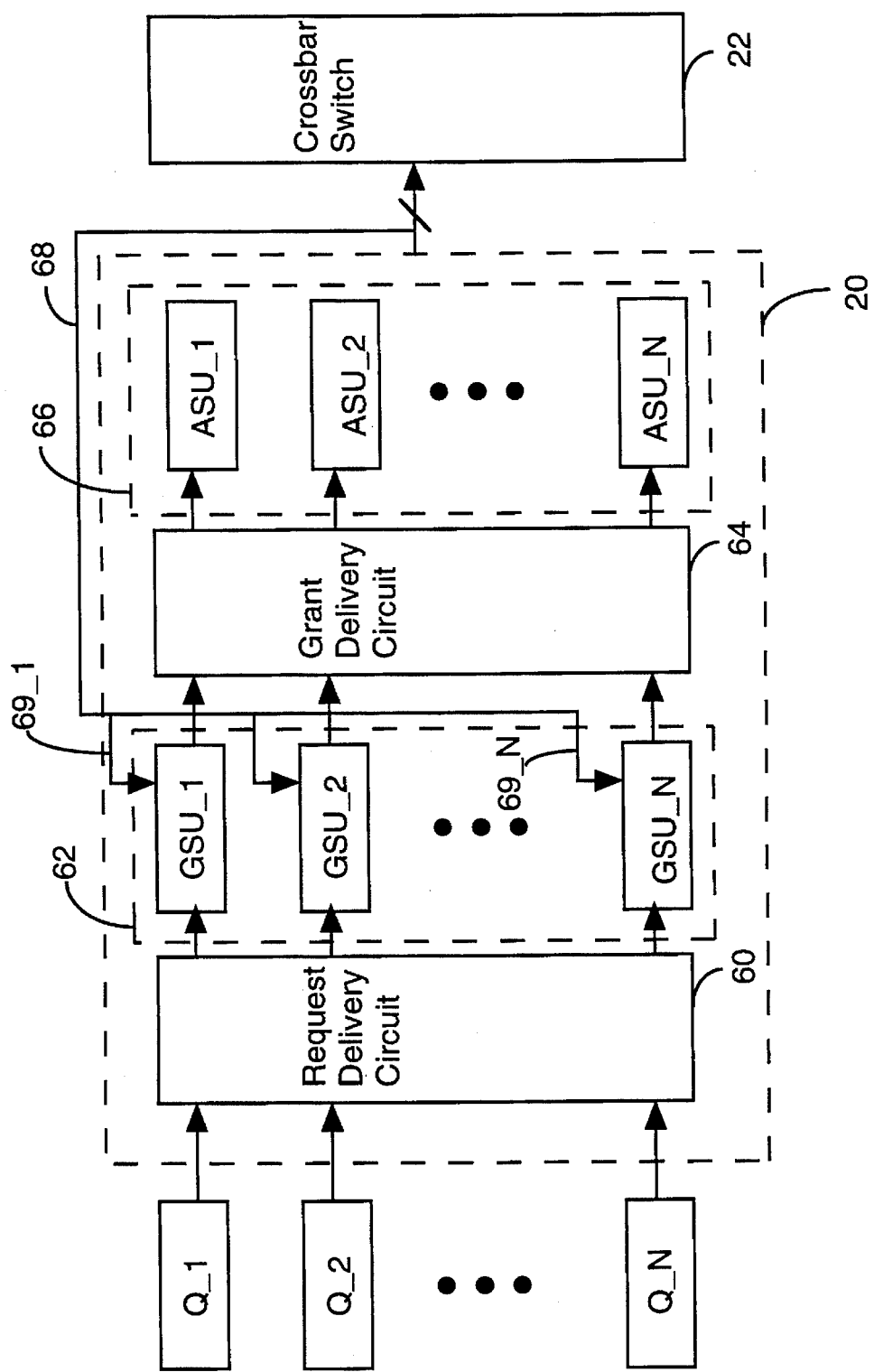
FIG. 6 is a more detailed representation of one embodiment of the apparatus of FIG. 1.

The methodology of the invention has now been fully described. Attention presently turns to different approaches to implementing the methodology of the invention. FIG. 6 illustrates one embodiment of a rotating priority iterative matching desynchronization scheduler in accordance with the invention. The figure illustrates input queues Q_1, Q_2, ..., Q_N. The destination information of the first cell of each input queue is routed by a request delivery circuit 60 to a set of grant scheduler 62 including a set of grant scheduler units GSU_1, GSU_2, GSU_N. A grant scheduler unit exists for every output device to be accessed. Thus, if the outputs are computers, a grant scheduler is provided for each computer on the network. The request delivery circuit merely needs to route each queued input request to a specified grant scheduler.

The output signals from the grant schedulers (granted requests, or selected input device grant signals) are routed to a grant delivery circuit 64. The grant delivery circuit 64 routes the output signals to an acceptance scheduler 66 including a set of acceptance scheduler units ASU_1, ASU_2, ..., ASU_N. The output signals from the acceptance scheduler units (accepted matches between inputs and outputs, input/output match signals) are delivered to crossbar switch 22, which makes the required connections between the selected inputs and the selected outputs. The operation and control of a crossbar switch is known in the art.

Figure 7:
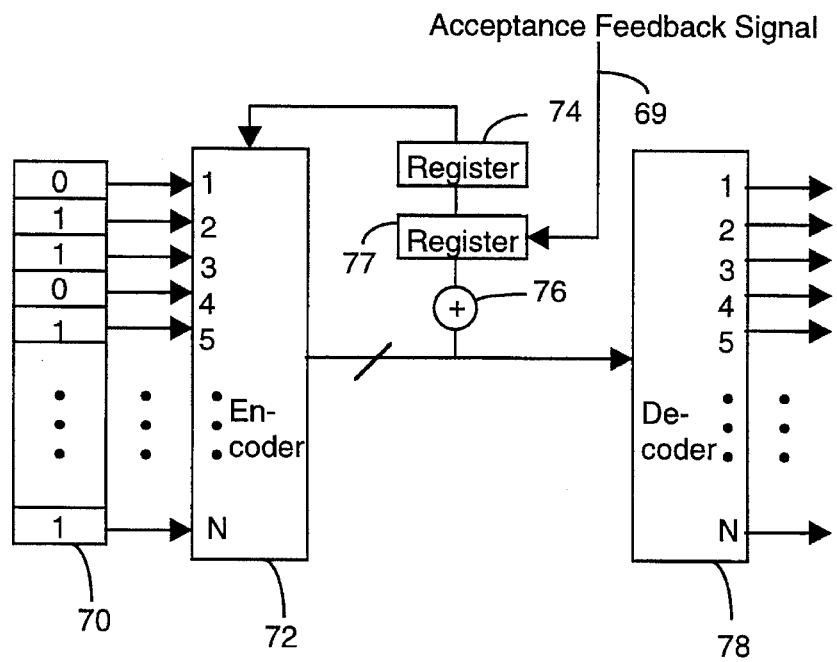
FIG. 7 depicts one embodiment of a scheduler that may be used in accordance with the invention.

FIG. 7 illustrates one embodiment of a grant scheduler unit that may be used in accordance with the invention. Requests are received at a request vector register 70. The request vector register 70 is N bits long, where N corresponds to the number of input devices (for instance, computers) on the network. Thus, there is a bit for each input device and its corresponding grant scheduler. In the example of FIG. 7, the second, third, fifth, and Nth bits are set to one, indicating that the second, third, fifth, and Nth input devices are requesting a grant. The second, third, fifth, and Nth input bits may be referred to as output device designation signals.

The request vector register 70 is connected to a priority encoder 72. As is known in the art, a priority encoder 72 selects as an output, an input value, as specified by another input signal, in this case a signal from a grant pointer register 74. Suppose the grant pointer register 74 stores a value of 3 corresponding to the third position of the request vector register 70. In this case, the output of the priority encoder 72 would be the value 3. There are $\log_2(N)$ priority encoder output lines. For example, if N equals sixteen, then there would be four output lines. Thus, in this example, the output lines would be set as 0011 (binary 3), indicating request vector position 3. The output of the priority encoder may be referred to as a device grant signal.

The logic of the priority encoder 72 only selects a set request vector register value. For example, if the value in the grant pointer register 74 was 4, then the priority encoder 72 would select the fifth value in the request vector register 70, because the fourth value is not set (digital low).

The output value of the priority encoder 72, the device grant signal, is incremented (modulo N) by incrementer 76. The results of the addition are stored in an incremented grant value register 77. The value in the incremented grant value register 77 is written to the grant pointer register 74, in response to an acceptance feedback signal. Returning to FIG. 6, it can be seen that $N^2$ lines (N scheduling units×N lines for each scheduling unit) leave the accept scheduler 66.

An acceptance feedback bus 68 is formed from the N lines designating each scheduling unit. As shown in FIG. 6, the acceptance feedback bus 68 terminates in an acceptance line 69_1, 69_2, ..., 69_N being attached to each grant scheduler unit. More particularly, each acceptance line serves as an enable signal for the incremented grant value register 77, forcing the contents of the register into the grant scheduler register 74.

Returning to FIG. 7, the output value of the priority encoder 72 is also conveyed to a decoder 78, a known device. The decoder has N output lines, one of which will be set high in response to the output from the priority encoder 72. Relying upon the previous example wherein the priority encoder selected the fifth value in the request vector, the decoder would interpret this binary input value (0101) and set its fifth output line high and the remaining outputs low. Thus, the fifth output device will have been granted.

An acceptance scheduler can be implemented using the same components. In the case of an acceptance scheduler, the request vector register 70 would store received input device grant signals that have been provided for a given input. The acceptance scheduler would then select a given grant using an acceptance scheduler priority designation register that stores an accept scheduler priority designation signal, in a manner consistent with the device of FIG. 7. The incremented grant value register would be substituted with an incremented accept value register. The incremented accept value register would be enabled by a decoder feedback line, as will be shown below.

Those skilled in the art will appreciate that the schedulers of the present invention are simple to implement in view of the fact that they rely upon standard components arranged in a straightforward configuration. Since the schedulers of the invention do not have to order the input values in a request vector, as required to implement the PIM technique, they provide an improvement over the schedulers of the PIM technology.

Figure 8:
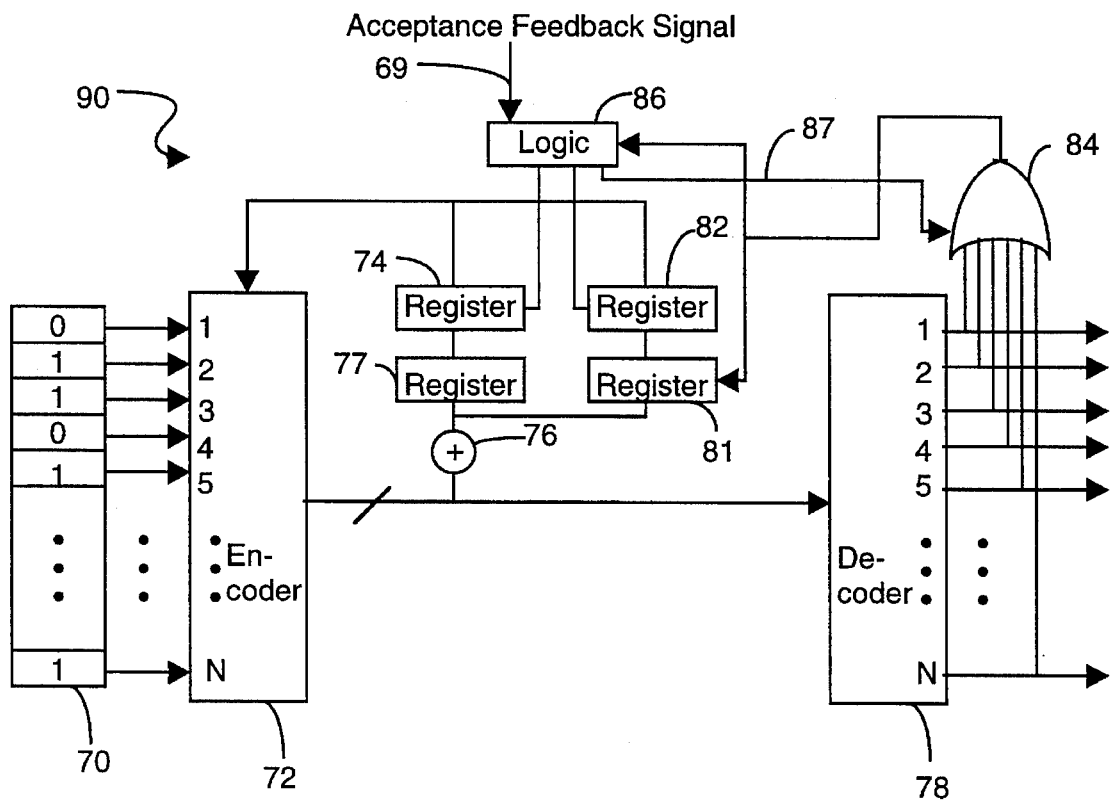
FIG. 8 depicts an alternate embodiment of a scheduler that may be used in accordance with the invention.

FIG. 8 is an alternate embodiment of the invention wherein a combined scheduler unit 90 is used for both granting and accepting requests at a request vector 70. The combined scheduler unit 90 is the same as the grant scheduler unit of FIG. 7 except that it includes an incremented accept value register 81, an accept scheduler priority designation register 82, and select logic 86 to select either the value in register 74 or the value in register 82. FIG. 8 also illustrates a logic OR gate 84 whose inputs are connected to each of the decoder 78 output lines. During an acceptance phase, the select logic 86 places an enable signal on line 87 for OR gate 84. As a result, if any input to the OR gate is high, then the output of the OR gate is high, causing the incremented value in the incremented accept designation register 81 to be loaded into accept register 82.

Figure 9:
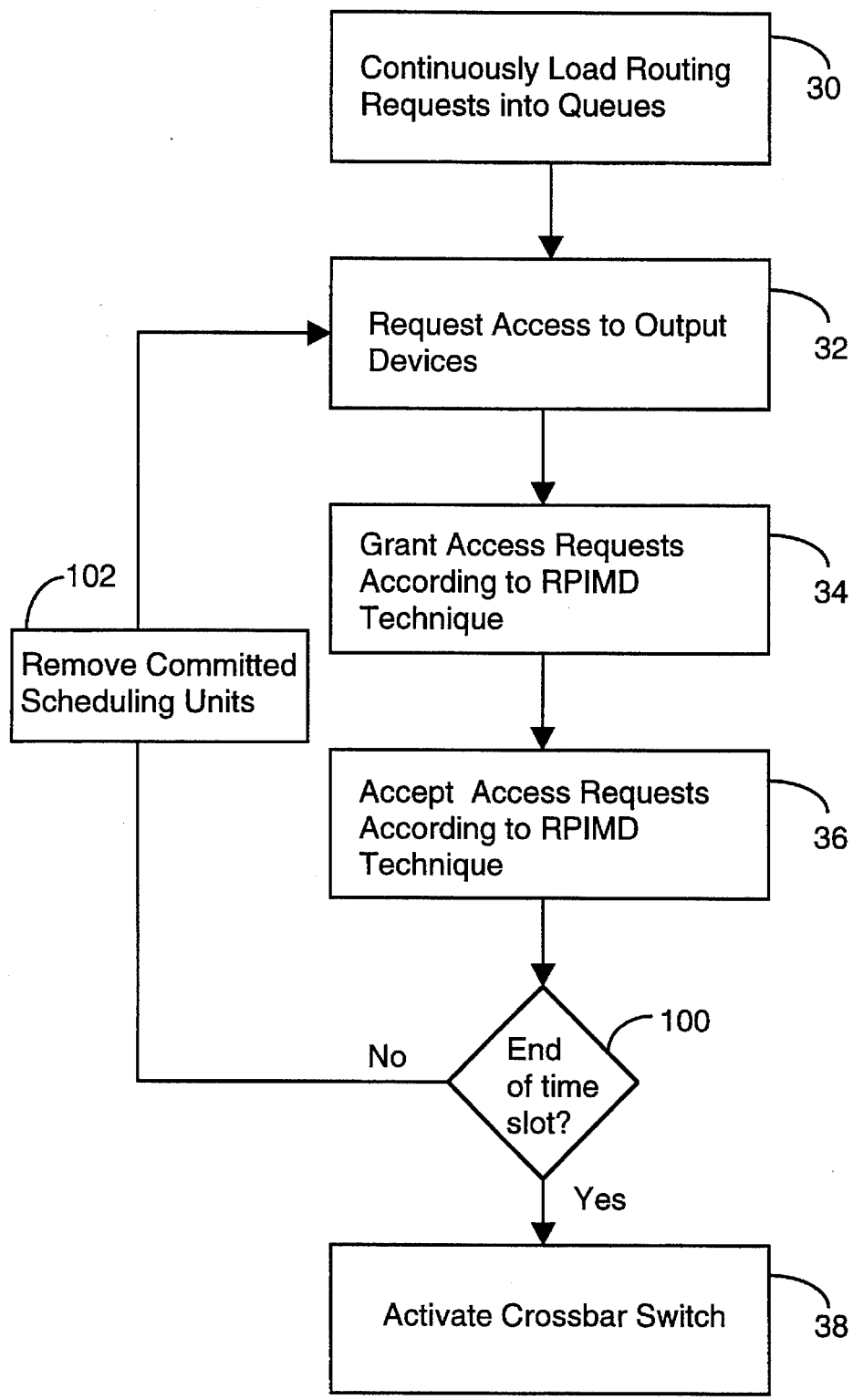
FIG. 9 is an alternate embodiment of the rotating priority iterative matching desynchronization method of the invention.

FIG. 9 illustrates an alternate embodiment of the methodology of the invention. In general, the method is consis tent with the method described in relation to FIG. 2. However, the method of FIG. 2 assumed that only a single iteration (the request, grant, and access phases) could be performed during a cell time slot (the time between activation of the crossbar switch 22). Generally, it is possible to perform a sequence of iterations during a cell time slot. Thus, the method of FIG. 9 tests to determine whether the end of a time slot has been reached or is within a threshold range of termination (block 100). If so, the crossbar switch is activated (block 38). If not, committed scheduling units are disabled and another processing iteration is performed (block 102). In other words, if a scheduling unit has derived an input/output match signal, then it is not enabled during a subsequent iteration. As a result, only those scheduling units that did not derive an input/output match signal are processed in a subsequent iteration.

Figure 10:
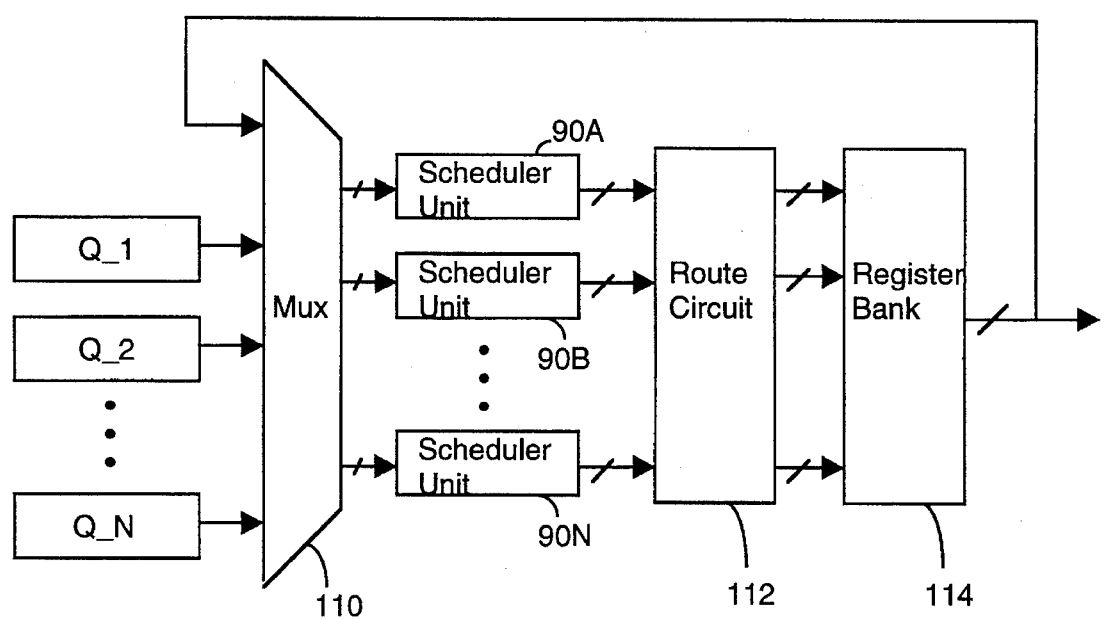
FIG. 10 is a more detailed representation of an alternate embodiment of the apparatus of FIG. 1.

FIG. 10 illustrates an apparatus that can be used to execute the method of FIG. 9. The apparatus of FIG. 10 utilizes combined scheduler units $90\_A, 90\_b, \ldots, 90\_N$, of the type shown in FIG. 8. In this embodiment, queued values of the type previously described are routed to a multiplexer 110. The scheduler units 90 receive the queued values from the multiplexer 110. In the grant phase, the grant register 74 of each scheduler unit 90 is used. The outputs from the grant phase are routed by a routing circuit 112. The output of the routing circuit 112 can be stored in a decision register bank 114. The values in the decision register bank 114 are then fedback to the multiplexer 110. The schedulers 90 then process the fedback values, relying upon the acceptance register 82. If this processing results in an acceptance at a particular scheduler unit 90, then the acceptance register 82 value is incremented in a manner previously described. As shown in FIG. 8, the output signal from the OR gate 84 may be used to disable the select logic 86. As a result, the select logic does not select a priority value and no processing takes place at the scheduling unit during subsequent iterations, effectively removing a scheduling unit once a match has been made. After subsequent iterations are processed in a given time slot, the crossbar switch 22 is activated and all scheduled inputs are delivered to their designated output device.

The basic techniques of the invention can be extended to include requests at multiple priority levels with only a small performance and complexity penalty. This implementation is called the prioritized iterative matching desynchronization technique. In this configuration, each input and output maintains a separate queue for each priority level established. This means that for an N×N switch with P priority levels, each input maintains P×N queues. Each scheduling unit maintains P+1 registers (it maintained 1 before). For example, output j maintains pointers: $g_{ji} \ldots g_{jp}$ and input i maintains pointers $a_{i1} \ldots a_{ip}$. The prioritized approach gives strict priority to the highest priority queue item.

The prioritized technique may be defined as follows:
1. Request (block 32). If input i selects the highest priority non-empty queue for output j, the input sends the priority level $1_{ij}$ of this queue to the output j.
2. Grant (block 34). If output j receives any requests, it determines the highest level request, i.e. it finds $L(j)=[\max(l_{ij})]\text{over}(j)$. The output then chooses one input among only those inputs that have requested at level $l_{ij}=L(j)$. When choosing among inputs at level L(j), the scheduler uses the pointer $g_{jL(j)}$ and chooses using the same rotating priority scheme as before. The output notifies each input whether its request was granted. The pointer $g_{jl(j)}$ is incremented to one location beyond the granted input if and only if input i accepts output j in step 3. If output j selects input i, the output passes the priority level $l'_{ij}=L(j)$ to the input.
3. Accept (block 36). If input i receives any grants, it determines the highest level grant, i.e. it finds $L'(i)=[\max(l'_{ij})]\text{over}[i]$. The input then chooses one output among only those that have requested at level $l_{ij}=L'(i)$. When choosing among the outputs at level $L'(i)$, the scheduler uses the pointer $a_{iL'(i)}$ and chooses using the same rotating priority scheme as before. The input notifies each output whether its grant was accepted. The pointer is incremented one location beyond the accepted output.

Implementation of this prioritized scheme is more complex than the basic technique, but can be fabricated from the same number of schedulers. The scheduler now consists of two parts: the first part determines the level l of the highest priority request (grant) and removes those requests (grants) with levels m<l; the second part of the scheduler is the same rotating arbiter as before.

The basic priority scheme of the invention can be varied into a threshold level technique that is based upon the highest level threshold that has been exceeded in an input FIFO. For example, if an input FIFO maintains two thresholds, the first threshold at five cells and the second threshold at ten cells, then if the FIFO contains eight cells, it makes a request at priority level one, and if the FIFO contains twelve cells, it makes a request at priority level two. This results in the longer FIFOs being processed with a higher priority. This reduces the number of queued cells.

Another variation on the basic implementation of the invention is to order elements in the scheduler. That is, elements are no longer in ascending order of input number, but rather are in an ordered list starting from the least recently to most recently selected. If a grant is successful, the input that is selected is moved to the end of the ordered list. Similarly, a least recently used list can be kept at the inputs for choosing among competing grants.

Regardless of the implementation, the techniques of the present invention offer a number of advantages over prior art techniques. First, since the invention is implemented with priority encoders, the schedulers of the invention are simple and can perform faster than the random arbiters used in the PIM technique. The rotating priority of the invention aids in assigning bandwidth equally among requesting connections. After each requesting (granting) input (output) wins an arbitration, the scheduler moves on to give priority to the next input (output). The rotating nature of the technique also reduces the burstiness of arriving traffic. Generally, burstiness in queuing systems leads to higher queuing delay. If a scheduler can reduce burstiness, the data to be transferred may experience lower queuing delay at downstream switches.

From a quantitative standpoint, the present invention provides a substantial improvement over the PIM technique. In a Bernoulli process with cell destinations distributed uniformly over all outputs, the PIM technique realizes a queuing delay, that approaches infinity, beginning at a maximum offered load of 63%. The PIM technique is limited to less than 63% because this is the probability that any given input will be able to connect to an output when all its input queues are occupied. The probability that no output will grant to a particular input is $((N-1)/N)^N$ which, for N=32, limits the probability that a connection will be made to 63%.

The present invention can deliver throughput with a finite queuing delay for loads that asymptotically approach 100%. This advantage is largely attributable to the desynchronization aspect of the invention. If all the input queues become non-empty, then the schedulers desynchronize or "slip" into a configuration that is 100% efficient until the backlog is cleared.

Regardless of the starting conditions, so long as the input queues are occupied, the present invention will slip into a rotating priority schedule providing each connection with exactly ½ of the link bandwidth. This result is shown in FIG. 3.

Because of the rotating priority of the schedulers, the invention provides a fair allocation of bandwidth among competing connections and is burst-reducing. The burst-reduction is simplest to understand under high load when all input queues are occupied: the scheduler will visit each competing connection in turn, so that even if a burst of cells for the same output arrives at the input, the burst will be spread out in time if there is competing traffic.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A switch of the type that includes a set of input queues, each of said input queues including at least one stored cell with an output device designation signal and a data signal, said output device designation signals of said stored cells being routed to a request delivery circuit that conveys said output device designation signals to a set of grant scheduler units, each grant scheduler unit corresponding to an output device specified by one or more of said output device designation signals, each of said grant scheduler units arbitrating between a set of received output device designation signals and generating an input device grant signal, said input device grant signals from said grant scheduler units being conveyed to a grant delivery circuit that conveys said input device grant signals to a set of accept scheduler units, each accept scheduler unit arbitrating between a set of received input device grant signals and selecting an input/output match signal, said input/output match signal being processed by a switching device that connects a selected stored cell in said set of input queues with an output device specified by said output device designation signal of said selected stored cell, the improvement comprising:

a set of rotating priority grant scheduler units, each of said rotating priority grant scheduler units producing a selected input device grant signal from said set of output device designation signals according to a grant scheduler priority designation signal; and a set of rotating priority accept scheduler units, each of said rotating priority accept scheduler units producing an input/output match signal from said set of received input device grant signals according to an accept scheduler priority designation signal;

wherein said rotating priority grant scheduler units each include a grant scheduler register that stores said grant scheduler priority designation signal, said grant scheduler priority designation signal being revised when said selected input device grant signal results in an input/output match signal at one of said rotating priority accept scheduler units; and wherein said rotating priority accept scheduler units each include an accept scheduler priority designation register that stores said accept scheduler priority designation signal, said accept scheduler priority designation signal being updated when said input/output match signal is selected.

2. The apparatus of claim 1 wherein each of said rotating priority grant scheduler units includes a request vector register for storing said output device designation signals.

3. The apparatus of claim 2 wherein each of said rotating priority grant scheduler units includes a priority encoder connected to said request vector register and said grant scheduler register, said priority encoder processing said output device designation signals from said request vector register and said grant scheduler priority designation signal from said grant scheduler register to produce said selected input device grant signal.

4. The apparatus of claim 3 wherein each of said rotating priority grant scheduler units includes a decoder connected to said priority encoder to process said selected input device grant signal.

5. The apparatus of claim 4 wherein each of said rotating priority grant scheduler units includes an incrementer connected to said priority encoder to increment said selected input device grant signal to produce an incremented grant signal.

6. The apparatus of claim 5 wherein each of said rotating priority grant scheduler units includes an incremented value register connected to said incrementer to store said incremented grant signal.

7. The apparatus of claim 6 wherein said incremented value register is connected to said grant scheduler register, said incremented value register writing said incremented grant signal into said grant scheduler register in response to an acceptance feedback signal, thereby revising said grant scheduler priority designation signal.

8. A method of operating a switch of the type that includes a set of input queues, each of said input queues including at least one stored cell with an output device designation signal and a data signal, said output device designation signals of said stored cells being routed to a request delivery circuit that conveys said output device designation signals to a set of grant scheduler units, each grant scheduler unit corresponding to an output device specified by one or more of said output device designation signals, each of said grant scheduler units arbitrating between a set of received output device designation signals and generating an input device grant signal, said input device grant signals from said grant scheduler units being conveyed to a grant delivery circuit that conveys said input device grant signals to a set of accept scheduler units, each accept scheduler unit arbitrating between a set of received input device grant signals and selecting an input/output match signal, said input/output match signal being processed by a switching device that connects a selected stored cell in said set of input queues with an output device specified by said output device designation signal of said selected stored cell, the method comprising the steps of:

(a) selecting an input device grant from said set of output device designation signals according to a grant scheduler priority designation signal;

(b) choosing an input/output match from said set of received input device grant signals according to an accept scheduler priority designation signal;

(c) revising said grant scheduler priority designation signal when said input device grant signal results in an input/output match signal at one of said rotating priority accept schedulers; and (d) updating said accept scheduler priority designation signal when said input/output match signal is selected.

9. The method of claim 8 further comprising the step of repeating steps (a) through (d) until a time slot period associated with said input queued switch is expired.

10. The method of claim 9 further including the step of (e) removing committed scheduling units before repeating steps (a) through (d).

11. A switch, comprising:
a set of input queues, with each input queue including a stored cell with an output device designation signal and a data signal;
a scheduler unit, including
a grant scheduler priority designation register to store a grant scheduler priority designation signal,
an accept scheduler priority designation register to store an accept scheduler priority designation signal, and
a processing circuit to
compare said grant scheduler priority designation signal with a set of output device designation signals derived from said stored cells of said input queues to produce a selected input device grant signal, and
compare said accept scheduler priority designation signal with a set of input device grant signals, including said selected input device grant signal, to produce an input/output match signal;
a priority revision circuit to
revise said grant scheduler priority designation signal when said processing circuit selects said input/output match signal from said selected input device grant signal,
update said accept scheduler priority designation signal when said input/output match signal is produced; and
a switch to process said input/output match signal such that a stored cell in said set of input queues is connected with an output device specified by said output device designation of said stored cell.

12. The apparatus of claim 11 wherein said scheduler unit includes a request vector register for alternately storing said set of output device designation signals and said set of input device grant signals.

13. The apparatus of claim 12 wherein said scheduler includes a selection circuit for selecting said grant scheduler priority designation signal from said grant scheduler designation register or said accept scheduler priority designation signal from said accept scheduler priority designation register.

14. The apparatus of claim 13 wherein said scheduler unit includes a priority encoder connected to said request vector register and said grant scheduler designation register to process said output device designation signals from said request vector register and said grant scheduler priority designation signal from said grant scheduler register to produce said selected input device grant signal.

15. The apparatus of claim 14 wherein said scheduler unit includes a decoder connected to said priority encoder to process said selected input device grant signal.

16. The apparatus of claim 15 wherein said scheduler unit includes an incrementer connected to said priority encoder to increment said selected input device grant signal to produce an incremented grant signal.

17. The apparatus of claim 16 wherein said scheduler unit includes a first incremented value register connected to said incrementer to store said incremented grant signal.

18. The apparatus of claim 17 wherein said incremented value register is connected to said grant scheduler register, said incremented value register writing said incremented grant signal into said grant scheduler register in response to an acceptance feedback signal, thereby revising said grant scheduler priority designation signal.

19. The apparatus of claim 13 wherein said scheduler unit includes a priority encoder connected to said request vector register and said accept scheduler designation register to process said set of input device grant signals stored within said request vector register and said grant scheduler priority designation signal from said grant scheduler register to produce said input/output match signal.

20. The apparatus of claim 19 wherein said scheduler unit includes a decoder connected to said priority encoder to process said input/output match signal.

21. The apparatus of claim 20 wherein said scheduler unit includes an incrementer connected to said priority encoder to increment said input/output match signal to produce an incremented input/output match signal.

22. The apparatus of claim 16 wherein said scheduler unit includes a second incremented value register connected to said second incrementer to store said incremented input/output match signal.

23. The apparatus of claim 22 wherein said second incremented value register is connected to said accept scheduler register, said second incremented value register writing said incremented input/output match signal into said accept scheduler register in response to said input/output match signal, thereby revising said accept scheduler priority designation signal.

* * * * *